United States Patent
Mordukhovich

(10) Patent No.: US 9,267,553 B2
(45) Date of Patent: Feb. 23, 2016

(54) TRANSMISSION INCLUDING DOG CLUTCH ARRANGEMENT AND METHOD

(71) Applicant: AVL Powertrain Engineering, Inc., Plymouth, MI (US)

(72) Inventor: Gregory Mordukhovich, Bloomfield Hills, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 0 days.

(21) Appl. No.: 14/264,521

(22) Filed: Apr. 29, 2014

(65) Prior Publication Data

US 2014/0318918 A1    Oct. 30, 2014

Related U.S. Application Data

(60) Provisional application No. 61/817,486, filed on Apr. 30, 2013.

(51) Int. Cl.
F16D 21/08    (2006.01)

(52) U.S. Cl.
CPC ..................... *F16D 21/08* (2013.01)

(58) Field of Classification Search
None
See application file for complete search history.

(56) References Cited

U.S. PATENT DOCUMENTS

| | | | |
|---|---|---|---|
| 4,440,281 A * | 4/1984 | Hauguth | ..................... 192/48.8 |
| 5,511,448 A | 4/1996 | Kameda et al. | |
| 6,571,654 B2 | 6/2003 | Forsyth | |
| 7,458,913 B2 | 12/2008 | Haka et al. | |
| 2008/0230295 A1 | 9/2008 | Grogg | |
| 2011/0155530 A1 | 6/2011 | Vierk et al. | |
| 2012/0085616 A1 | 4/2012 | Ziemer | |
| 2012/0103116 A1 | 5/2012 | Hunold et al. | |
| 2012/0152685 A1 | 6/2012 | Phillips et al. | |
| 2012/0234641 A1 | 9/2012 | Petzold et al. | |

FOREIGN PATENT DOCUMENTS

| | | |
|---|---|---|
| DE | 4200998 A1 | 7/1993 |
| EP | 0845618 A2 | 6/1998 |
| EP | 1610038 A1 | 12/2005 |
| WO | WO 2006/006919 A2 * | 1/2006 |

* cited by examiner

*Primary Examiner* — Rodney H Bonck
(74) *Attorney, Agent, or Firm* — Harness, Dickey & Pierce, P.L.C.

(57) ABSTRACT

A transmission includes a housing, a first shaft rotatably supported relative to the housing, and a second shaft rotatably coupled to the first shaft. A switch-type clutch assembly is movable between an engaged state having a first clutch member coupled to a second clutch member and a disengaged state having the first clutch member separated from the second clutch member. The housing rotates with the first shaft when the switch-type clutch assembly is in the engaged state. A friction clutch is movable between an engaged state having a first friction plate coupled to a second friction plate and a disengaged state having the first frication plate separated from the second frication plate. The second shaft is fixed for rotation with the first shaft via the housing when the switch-type clutch assembly and the friction clutch assembly are both in the engaged state.

20 Claims, 2 Drawing Sheets

TRANSMISSION INCLUDING DOG CLUTCH ARRANGEMENT AND METHOD

CROSS-REFERENCE TO RELATED APPLICATIONS

This application claims the benefit of U.S. Provisional Application No. 61/817,486, filed on Apr. 30, 2013. The entire disclosure of the above application is incorporated herein by reference.

FIELD

The present disclosure relates to a transmission and more particularly to a clutch arrangement and control method for a transmission.

BACKGROUND

This section provides background information related to the present disclosure which is not necessarily prior art.

An automatic transmission provides smooth shifting between gears. Planetary and dual-clutch transmissions are two alternative forms of automatic transmissions. A planetary automatic transmission may have lower gear sliding-related losses due to smaller gear modules (having shorter gear teeth) than those used on a dual-clutch transmission. In addition, a planetary automatic transmission can often utilize lower viscosity lubricant for gear and clutch protection as compared to a dual-clutch transmission. Nonetheless, a planetary automatic transmission is usually less efficient than a dual-clutch transmission due to the fact that a planetary automatic transmission utilizes a larger number of wet clutches (i.e., friction-plate clutches) than does a dual-clutch transmission, which typically incorporates switch-type clutches such as dog clutches.

Clutch inefficiency in a planetary automatic transmission comes primarily from drag-related losses of spinning, disengaged friction plates of the wet clutches. While drag-related losses can be minimized by providing adequate spacing between the friction plates, such additional spacing typically results in longer shift times.

A dog clutch or other switch-type clutch arrangement may provide a more efficient clutch configuration in its disengaged state. However, use of such switch-type clutches does not allow for appropriate gradual energy dissipation, thereby resulting in abrupt gear shifts.

In sum, wet clutches provide a longer shift time when compared to switch-type clutch arrangements, and, thus, a smoother shift, but suffer from the disadvantage of spinning losses when disengaged.

SUMMARY

This section provides a general summary of the disclosure, and is not a comprehensive disclosure of its full scope or all of its features.

A transmission is provided and includes a housing, a first shaft rotatably supported relative to the housing, and a second shaft rotatably coupled to the first shaft. A switch-type clutch assembly includes a first clutch member fixed for rotation with the first shaft and a second clutch member fixed for rotation with the housing. The switch-type clutch assembly is movable between an engaged state having the first clutch member coupled to the second clutch member and a disengaged state having the first clutch member separated from the second clutch member. The housing rotates with the first shaft when the switch-type clutch assembly is in the engaged state. A friction clutch assembly includes a first friction plate fixed for rotation with the housing and a second friction plate fixed for rotation with the second shaft. The friction clutch assembly is movable between an engaged state having the first friction plate coupled to the second friction plate and a disengaged state having the first frication plate separated from the second frication plate. The second shaft is fixed for rotation with the first shaft via the housing when the switch-type clutch assembly and the friction clutch assembly are both in the engaged state.

In another configuration, a transmission is provided and includes a housing, a first shaft rotatably supported relative to the housing, and a second shaft rotatably coupled to the first shaft. A switch-type clutch assembly includes a first clutch member fixed for rotation with the first shaft and a second clutch member fixed for rotation with the housing. The switch-type clutch assembly is movable between an engaged state having the first clutch member coupled to the second clutch member and a disengaged state having the first clutch member separated from the second clutch member. The housing rotates with the first shaft when the switch-type clutch assembly is in the engaged state. A friction clutch assembly includes a first friction plate fixed for rotation with the housing and a second friction plate fixed for rotation with the second shaft. The friction clutch assembly is movable between an engaged state having the first friction plate coupled to the second friction plate and a disengaged state having the first frication plate separated from the second frication plate. The second shaft is stationary when the switch-type clutch assembly and the friction clutch assembly are both in the disengaged state and the first shaft rotates relative to the second shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
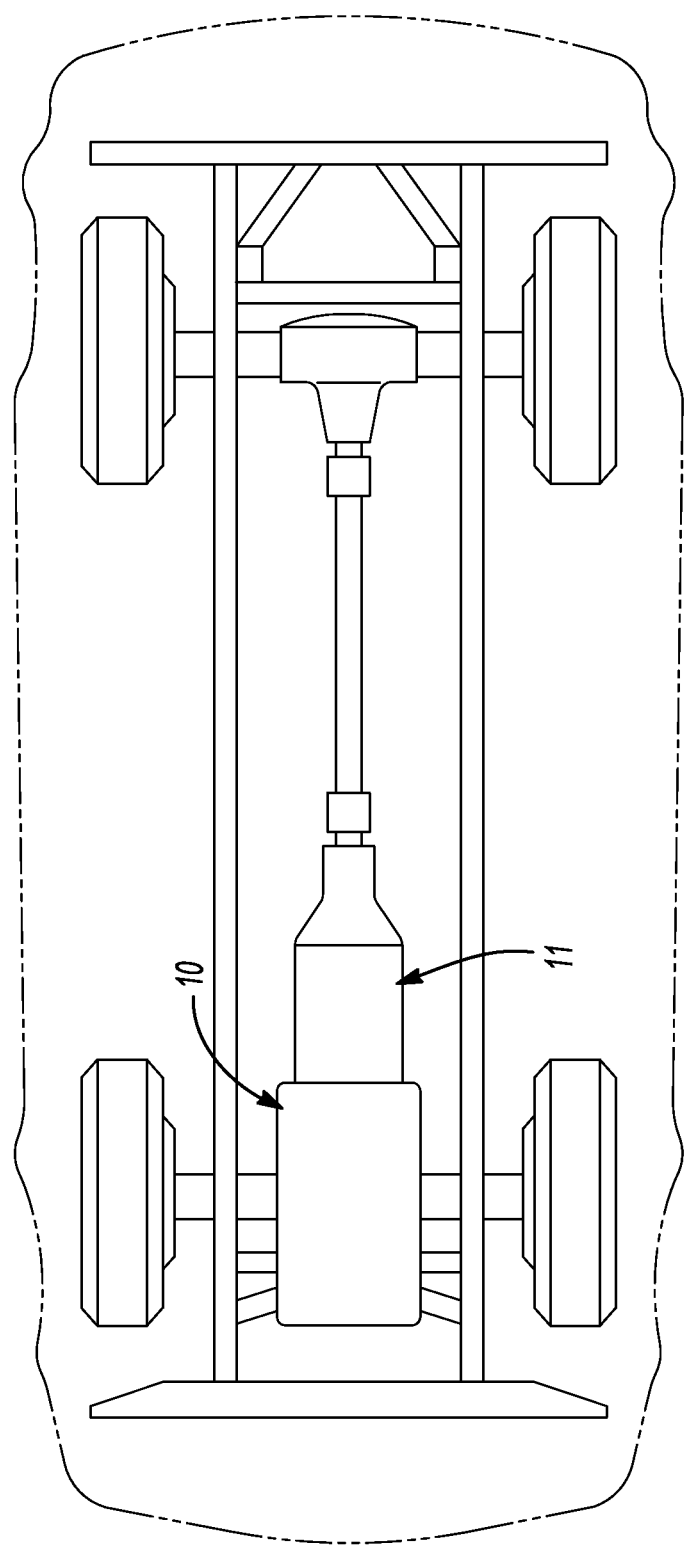
FIG. 1 is a schematic representation of a vehicle incorporating a transmission in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
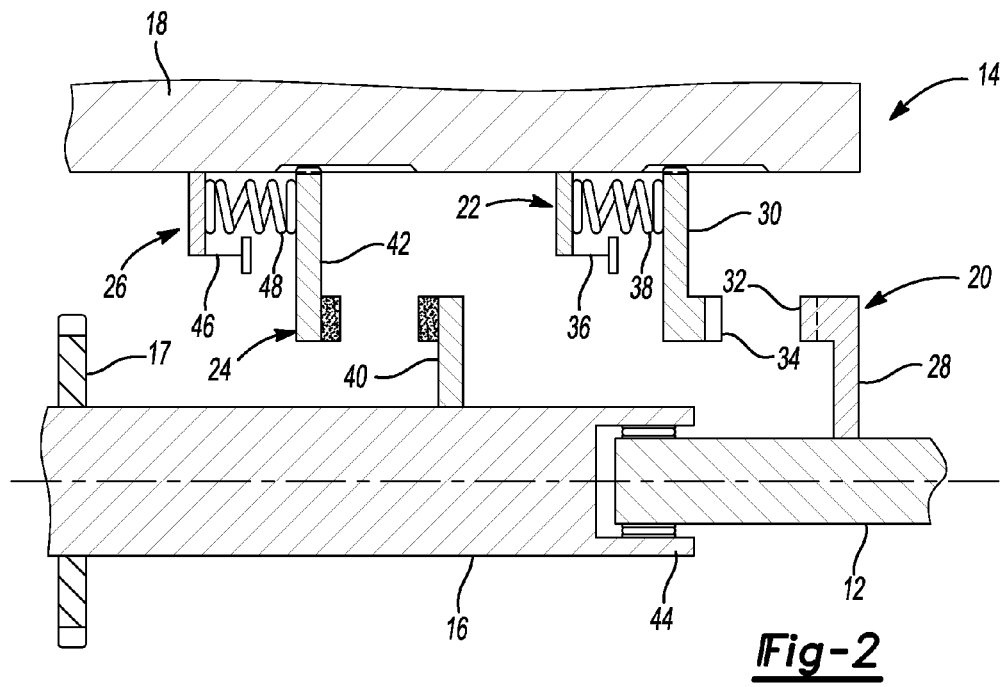
FIG. 2 is a cross-sectional view of a clutch assembly in accordance with the principles of the present disclosure for use with the transmission of FIG. 1.

With reference to FIG. 1, a drive system for a motor vehicle is provided and may include a power source such as an engine 10 and a transmission 11. With reference to FIGS. 1 and 2, the transmission 11 may be driven by the engine 10 via a first shaft 12 and may include a series of clutch assemblies 14. While the transmission 11 may include any number of clutch assemblies 14, only one such clutch assembly 14 will be described and shown in detail. Identical clutch assemblies 14 may be used within the transmission 11 to establish a desired power flow through the transmission 11 and, thus, a desired gear ratio.

The transmission 11 may include a second shaft 16 concentrically mounted to the first shaft 12. The second shaft 16 may be driven by the first shaft 12 when the clutch assembly 14 is in an engaged state and may remain motionless when the clutch assembly 14 is in a disengaged state, as will be described in detail below.

The clutch assembly 14 may include a switch-type clutch assembly 20 such as a dog clutch arrangement or a castle-teeth arrangement that is movable between an engaged state and a disengaged state. While the clutch assembly 14 could include virtually any switch-type clutch arrangement, the switch-type clutch assembly will be described and shown as being a dog clutch assembly 20.

The dog clutch assembly 20 may include a first dog member 28 and a second dog member 30. The first dog member 28 may be coupled to the first shaft 12, such that the first dog member 28 rotates with the first shaft 12 when power is supplied to the first shaft 12 via the engine 10. The second dog member 30 may be coupled to a housing 18 such that rotation of the second dog member 30 rotates the housing 18. Coupling of the second dog member 30 to the housing 18 may also be in a slidable manner via a spline, for example, such that the second dog member 30 is capable of translational movement relative to the housing 18 in a direction substantially parallel to the longitudinal axis of the housing 18.

The first dog member 28 may include at least one first dog engagement element 32 for matingly engaging a corresponding second dog engagement element 34 on the second dog member 30. The first dog engagement element 32 may be a pin, a castle tooth, a mechanical diode, or a similar engagement element, while the second dog engagement element 34 may be an aperture, a castle tooth, or a similar element for engaging the first dog engagement element 32.

The dog clutch actuator assembly 22 may include a first actuator piston 36 and a first biasing member 38 coupled to the second dog member 30. The first biasing member 38 may apply a force on the second dog member 30, thereby biasing the second dog member 30 in a direction away from the first dog member 28.

The first actuator piston 36 may be concentrically mounted to the housing 18 and may be an annular piston. The dog clutch actuator assembly 22 may selectively move relative to the housing 18 and in a direction parallel to the longitudinal axis of the first shaft 12 to cause engagement between the first dog member 28 and the second dog member 30. Specifically, actuation of the first actuator piston 36 may cause the actuator to contact the second dog member 30, thereby causing the second dog member 30 to overcome the force of the first biasing member 38 and translate relative to the housing 18 into engagement with the first dog member 28. Engagement between the first dog member 28 and the second dog member 30 moves the dog clutch from the disengaged state to the engaged state.

The clutch assembly 14 may also include a friction clutch assembly 24 that works in conjunction with the dog clutch assembly 20 to establish a desired gear or brake. The friction clutch assembly 24 may include a first friction plate 40 and a second friction plate 42. The first friction plate 40 may be coupled to the second shaft 16 and may rotate with the second shaft 16 about a longitudinal axis that is substantially parallel to the longitudinal axis of the first shaft 12. The second shaft 16 may further include a hub portion 44 that is rotatably coupled to the first shaft 12, or vice versa, such that the second shaft 16 and the first shaft 12 can be independently, but coaxially, rotated.

In one configuration, the second shaft 16 may be formed as part of the housing 18 or may be attached to the housing 18 and, as a result, is stationary. Fixing a position of the second shaft 16 relative the housing 18 allows the clutch assembly 14 to act as a brake to selectively restrict rotation of the first shaft 12 relative to the housing 18. In another configuration, the housing 18 rotates relative to the second shaft 16 when the friction clutch assembly 24 is in the disengaged state and rotates with the second shaft 16 when the friction clutch assembly 24 is in the engaged state. Rotation of the second shaft 16 causes rotation of a gear 17 fixed for rotation with the second shaft 16 and, thus, establishes a desired gear ratio of the transmission 11.

The second friction plate 42 may be coupled to the housing 18. Coupling of the second friction plate 42 to the housing 18 may permit sliding or translating the second friction plate 42 relative to the housing 18 and parallel to the longitudinal axis of the housing 18.

The friction clutch actuator assembly 26 may include a second actuator piston 46 and a second biasing member 48 coupled to the second friction plate 42. The second biasing member 48 may apply a force to the second friction plate 42, thereby biasing the second friction plate 42 in a direction away from the first friction plate 40.

The second actuator piston 46 may be an annular piston and may be concentrically mounted within the housing 18. The friction clutch actuator assembly 26 may be mounted such that actuation thereof causes the second actuator piston 46 to travel parallel to the longitudinal axis of the second shaft 16 and into contact with the second friction plate 42. Actuation of the second actuator piston 46 and contact with the second friction plate 42 may cause the second friction plate 42 to overcome the force of the second biasing member 48 and translate relative to the housing 18 into frictional engagement with the first friction plate 40.

Frictional engagement between the first friction plate 40 and the second friction plate 42 can be accomplished by direct contact between the first and second friction plates 40, 42, and/or via a hydraulic fluid there between. While the friction clutch assembly 24 is described as including a first friction plate 40 and a second friction plate 42, the friction clutch assembly 24 may include a plurality of interleaved first friction plates 40 and second friction plates 42.

With reference to FIG. 2, operation of the clutch assembly 14 will be described in detail. The dog clutch assembly 20 may be moved from the disengaged state to the engaged state by actuating the first actuator piston 36 via the dog clutch actuator assembly 22. The first actuator piston 36 engages the second dog member 30, thereby causing the second dog member 30 to move in a direction substantially parallel to the axis of the first shaft 12 and toward the first dog member 28. The second dog engagement element 34 engages the first dog engagement element 32, thereby causing the second dog member 30 and the housing 18 to rotate with the first shaft 12. In this way, the dog clutch assembly 20 allows relative rotation between the first shaft 12 and the housing 18 in the disengaged state and provides an efficient torque transmission mechanism between the first shaft 12 and the second shaft 16 in the engaged state.

Prior to engagement of the dog clutch assembly 20, the housing 18 and second shaft 16 are in a stationary configuration while the first shaft 12 rotates about its longitudinal axis. In this way, frictional losses and inefficiencies caused by any drag associated with a rotating first friction plate 40 or second friction plate 42 are eliminated.

Rotation of the housing 18 via the dog clutch assembly 20 produces relative rotation of the first friction plate 40 with respect to the second friction plate 42. Upon actuation of the friction clutch actuator assembly 26, the second actuator piston 46 engages the second friction plate 42, thereby causing the second friction plate 42 to move relative to the housing 18, as described above, and into frictional engagement with the first friction plate 40. At this point, the dog clutch assembly 20 and the friction clutch assembly 24 are in the engaged state and the second shaft 16 rotates with the first shaft 12 via the housing 18.

The second shaft 16 may be uncoupled from the first shaft 12 by releasing the actuator pistons 36, 46 to once again permit the first shaft 12 to rotate relative to the second shaft 16 without causing rotation of the second shaft 16. Namely, releasing the second actuator piston 46 uncouples the second shaft 16 from the housing 18 and releasing the first actuator piston 36 uncouples the first shaft 12 from the housing 18. Accordingly, the first shaft 12 is permitted to rotate relative to the second shaft 16 when the clutch assemblies 20, 24 are in the disengaged state, as the housing 18 cannot and does not transmit a rotational force from the first shaft 12 to the second shaft 16.

Figure 3:
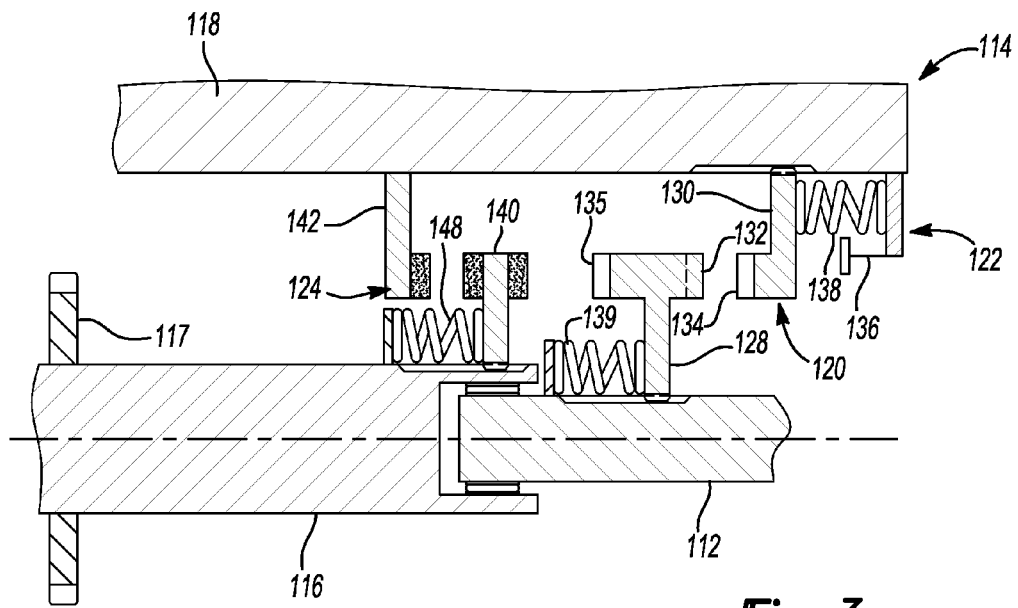
FIG. 3 is a cross-sectional view of a clutch assembly in accordance with the principles of the present disclosure for use with the transmission of FIG. 1.

With reference to FIG. 3, an alternative configuration of a dog clutch assembly 120 is provided and may include a first dog member 128 and a second dog member 130. The first dog member 128 may be coupled to a first shaft 112, such that the first dog member 128 rotates with the first shaft 112 when power is supplied to the first shaft 112 via the engine. Coupling of the first dog member 128 to the first shaft 112 may also be in a slidable manner, via a spline, for example, such that the first dog member 128 is capable of translational movement relative to the first shaft 112 and parallel to the longitudinal axis of the first shaft 112. The second dog member 130 may be coupled to a housing 118, such that rotation of the second dog member 130 rotates the housing 118, or vice versa. Coupling of the second dog member 130 to the housing 118 may also be in a slidable manner, via a spline, for example, such that the second dog member 130 is capable of translational movement relative to the housing 118 and parallel to the longitudinal axis of the housing 118.

The first dog member 128 may include at least one first dog engagement element 132 for matingly engaging a corresponding second dog engagement element 134 on the second dog member 130, and a frictional engagement surface 135 for frictionally engaging the friction clutch assembly 124. The first dog engagement element 132 may be a pin, a castle tooth, a mechanical diode, or similar engagement elements, while the second dog engagement element 134 may be an aperture, a castle tooth, or similar elements for engaging the first dog engagement element 132.

The dog clutch actuator assembly 122 may include a first actuator piston 136, a first biasing member 138, and a second biasing member 139. The first biasing member 138 may apply a force on the second dog member 130, thereby biasing the second dog member 130 in a direction away from the first dog member 128. The second biasing member 139 may apply a force on the first dog member 128, thereby biasing the first dog member 128 toward the second dog member 130.

The first actuator piston 136 may be concentrically mounted to the housing 118 and may be an annular piston. The dog clutch actuator assembly 122 may selectively move relative to the housing 118 and in a direction parallel to the longitudinal axis of the first shaft 112 and into contact with the second dog member 130. Specifically, actuation of the first actuator piston 136 may cause the first actuator piston 136 to contact the second dog member 130, thereby causing the second dog member 130 to overcome the force of the first biasing member 138 and translate relative to the housing 118 and into engagement with the first dog member 128. Engagement between the first dog member 128 and the second dog member 130 moves the dog clutch assembly 120 from the disengaged state to the engaged state.

The clutch assembly 114 may also include a friction clutch assembly 124 that works in conjunction with the dog clutch assembly 120 to establish a desired gear or brake. The friction clutch assembly 124 may include a first friction plate 140, a second friction plate 142, and a third biasing member 148. The first friction plate 140 may be coupled to a second shaft 116 and may rotate with the second shaft 116 about a longitudinal axis that is substantially parallel to the longitudinal axis of the first shaft 112. Coupling of the first friction plate 140 to the second shaft 116 may also be in a slidable manner, via a spline, for example, such that the first friction plate 140 is capable of translational movement relative to the second shaft 116 and parallel to the longitudinal axis of the second shaft 116.

In one configuration, the second shaft 116 may be formed as part of the housing 118 or may be attached to the housing 118 and, as a result, is stationary. Fixing a position of the second shaft 116 relative the housing 118 allows the clutch assembly 114 to act as a brake to selectively restrict rotation of the first shaft 112 relative to the housing 118. In another configuration, the housing 118 rotates relative to the second shaft 116 when the friction clutch assembly 124 is in the disengaged state and rotates with the second shaft 116 when the friction clutch assembly 124 is in the engaged state. Rotation of the second shaft 116 causes rotation of a gear 117 fixed for rotation with the second shaft 116 and, thus, establishes a desired gear ratio of the transmission 111.

The third biasing member 148 may apply a force to the first friction plate 140, thereby biasing the first friction plate 140 in a direction away from the second friction plate 142. The second friction plate 142 may be coupled to the housing 118, such that rotation of the second friction plate 142 causes rotation of the housing 118, or vice versa. While the friction clutch assembly 124 is described as including a first friction plate 140 and a second friction plate 142, the friction clutch assembly 124 may include a plurality of interleaved first friction plates 140 and second friction plates 142.

With reference to FIG. 3, operation of the clutch assembly 114 will be described in detail. The dog clutch assembly 120 may be moved from the disengaged state to the engaged state by actuating the first actuator piston 136 via the dog clutch actuator assembly 122. Specifically, the first actuator piston 136 engages the second dog member 130, thereby causing the second dog member 130 to move in a direction substantially parallel to the axis of the first shaft 112 and toward the first dog member 128. The second dog engagement element 134 engages the first dog engagement element 132, thereby causing the second dog member 130 and the housing 118 to rotate with the first shaft 112. In this way, the dog clutch assembly 120 eliminates relative rotation between the first shaft 112 and the housing 118 in the disengaged state and provides an efficient torque transmission mechanism therebetween in the engaged state.

The housing 118 is permitted to freely rotate relative to the second shaft 116 prior to engagement of the dog clutch assembly 120. Accordingly, the first shaft 112 is permitted to rotate about its longitudinal axis without causing rotation of either the second shaft 116 or the housing 118. In this way, frictional losses and inefficiencies caused by any drag associated with a rotating first friction plate 140 or second friction plate 142 are eliminated.

Rotation of the housing 118 via the dog clutch assembly 120 causes the second friction plate 142 to rotate with respect to the first friction plate 140. When sufficient force is applied on the second dog member 130 by the first actuator piston 136, the second dog member 130 will apply a corresponding force on the first dog member 128, thereby causing the first dog member 128 to overcome the force of the second biasing member 139 and translate along the first shaft 112, as described above, and into frictional engagement the first friction plate 140. Frictional engagement between the first friction plate 140 and the first dog member 128 causes the first friction plate 140 and the second shaft 116 to rotate with the first shaft 112. Further, sufficient movement of the first dog member 128 and, thus, the first friction plate 140, causes the first friction plate 140 to engage the second friction plate 142. Engagement between the first friction plate 140 and the second friction plate 142 causes rotation of the second shaft 116 via the housing 118 when the first shaft 12 is rotated.

The second shaft 116 may be disengaged from the first shaft 112 by releasing the force exerted on the first dog member 128 by the first actuator piston 136. Releasing the force exerted on the first dog member 128 allows the clutch assemblies 120, 124 to return to the disengaged state, thereby permitting the first shaft 112 to rotate without causing rotation of the second shaft 116 or housing 118.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transmission, comprising:
   a housing;
   a first shaft rotatably supported relative to said housing;
   a second shaft;
   a dog clutch assembly including a first clutch member fixed for rotation with said first shaft and a second clutch member fixed for rotation with said housing, said dog clutch assembly movable between an engaged state having said first clutch member coupled to said second clutch member and a disengaged state having said first clutch member separated from said second clutch member, said housing rotating with said first shaft when said dog clutch assembly is in said engaged state; and
   a friction clutch assembly including a first friction plate fixed for rotation with said housing and a second friction plate fixed for rotation with said second shaft, said friction clutch assembly movable between an engaged state having said first friction plate coupled to said second friction plate and a disengaged state having said first friction plate separated from said second friction plate, said second shaft fixed for rotation with said first shaft via said housing when said dog clutch assembly and said friction clutch assembly are both in said engaged state.

2. The transmission of claim 1, wherein said second shaft is rotatable relative to said first shaft when said dog clutch assembly is in said engaged state and said friction clutch assembly is in said disengaged state.

3. The transmission of claim 1, wherein said first shaft is rotatable relative to said housing and relative to said second shaft when said dog clutch assembly and said friction clutch assembly are both in said disengaged state.

4. The transmission of claim 1, further comprising a gear fixed for rotation with said second shaft, said gear establishing a desired gear ratio when said dog clutch assembly and said friction clutch assembly are both in said engaged state.

5. The transmission of claim 1, wherein said second shaft is stationary and restricts rotation of said housing and said first shaft when said dog clutch assembly and said friction clutch assembly are both in said engaged state.

6. The transmission of claim 1, wherein said second clutch member is slidably attached to said housing and is movable in a direction substantially parallel to a longitudinal axis of said housing between a first position and a second position, said dog clutch assembly in said engaged state when said second clutch member is in said first position and in said disengaged state when said second clutch member is in said second position.

7. The transmission of claim 6, further comprising an actuator operable to selectively move said second clutch member between said first position and said second position.

8. The transmission of claim 1, wherein said first friction plate is slidably attached to said housing and is movable in a direction substantially parallel to a longitudinal axis of said housing between a first position and a second position, said friction clutch assembly in said engaged state when said first friction plate is in said first position and in said disengaged state when said first friction plate is in said second position.

9. The transmission of claim 8, further comprising an actuator operable to selectively move said first friction plate between said first position and said second position.

10. The transmission of claim 1, wherein said second shaft is concentric with said first shaft.

11. A transmission, comprising:
a housing;
a first shaft rotatably supported relative to said housing;
a second shaft;
a dog clutch assembly including a first clutch member fixed for rotation with said first shaft and a second clutch member fixed for rotation with said housing, said dog clutch assembly movable between an engaged state having said first clutch member coupled to said second clutch member and a disengaged state having said first clutch member separated from said second clutch member, said housing rotating with said first shaft when said dog clutch assembly is in said engaged state; and
a friction clutch assembly including a first friction plate fixed for rotation with said housing and a second friction plate fixed for rotation with said second shaft, said friction clutch assembly movable between an engaged state having said first friction plate coupled to said second friction plate and a disengaged state having said first friction plate separated from said second friction plate, said second shaft being stationary when said dog clutch assembly and said friction clutch assembly are both in said disengaged state and said first shaft rotates relative to said second shaft.

12. The transmission of claim 11, wherein said second shaft is rotatable relative to said first shaft when said dog clutch assembly is in said engaged state and said friction clutch assembly is in said disengaged state.

13. The transmission of claim 11, wherein said second shaft is fixed for rotation with said first shaft via said housing when said dog clutch assembly and said friction clutch assembly are both in said engaged state.

14. The transmission of claim 11, further comprising a gear fixed for rotation with said second shaft, said gear establishing a desired gear ratio when said dog clutch assembly and said friction clutch assembly are both in said engaged state.

15. The transmission of claim 11, wherein said second shaft is stationary and restricts rotation of said housing and said first shaft when said dog clutch assembly and said friction clutch assembly are both in said engaged state.

16. The transmission of claim 11, wherein said second clutch member is slidably attached to said housing and is movable in a direction substantially parallel to a longitudinal axis of said housing between a first position and a second position, said dog clutch assembly in said engaged state when said second clutch member is in said first position and in said disengaged state when said second clutch member is in said second position.

17. The transmission of claim 16, further comprising an actuator operable to selectively move said second clutch member between said first position and said second position.

18. The transmission of claim 11, wherein said first friction plate is slidably attached to said housing and is movable in a direction substantially parallel to a longitudinal axis of said housing between a first position and a second position, said friction clutch assembly in said engaged state when said first friction plate is in said first position and in said disengaged state when said first friction plate is in said second position.

19. The transmission of claim 18, further comprising an actuator operable to selectively move said first friction plate between said first position and said second position.

20. The transmission of claim 11, wherein said second shaft is concentric with said first shaft.

* * * * *